United States Patent [19]

Zoller

[11] Patent Number: 5,399,394
[45] Date of Patent: Mar. 21, 1995

[54] TRIM STRIP WITH ONE-PIECE HEAT SET PLASTIC COVER OVER METAL CORE

[75] Inventor: Robert A. Zoller, Bay Village, Ohio

[73] Assignee: The Standard Products Company, Cleveland, Ohio

[21] Appl. No.: 178,787

[22] Filed: Jan. 7, 1994

Related U.S. Application Data

[63] Continuation of Ser. No. 703,242, May 20, 1991, Pat. No. 5,277,950, which is a continuation-in-part of Ser. No. 619,126, Nov. 28, 1990, Pat. No. 5,328,731.

[51] Int. Cl.$^6$ ............................................. B60R 13/04
[52] U.S. Cl. .................................... 428/31; 52/716.5; 293/128
[58] Field of Search ................. 428/31; 264/DIG. 60, 264/237; 293/128; 52/716.5

[56] References Cited

U.S. PATENT DOCUMENTS

| 4,654,238 | 3/1987 | Yamazaki et al. | 428/31 |
| 4,668,543 | 5/1987 | Schlenz | 428/31 |
| 4,869,937 | 9/1989 | Nagata et al. | 428/31 |
| 4,877,657 | 10/1989 | Yaver | 428/31 |
| 4,949,507 | 8/1990 | Vaughan | 428/122 X |
| 5,042,201 | 8/1991 | Vaughan | 49/490.1 X |
| 5,268,053 | 12/1993 | Zoller | 428/31 X |
| 5,277,950 | 1/1994 | Zoller | 428/31 |
| 5,281,292 | 1/1994 | Zoller | 428/31 X |
| 5,328,731 | 7/1994 | Zoller | 264/237 X |

Primary Examiner—Henry F. Epstein
Attorney, Agent, or Firm—Harness, Dickey & Pierce

[57] ABSTRACT

An apparatus and method of manufacturing a trim strip with an outer heat settable layer bonded to a core. The method includes heating a liquid heat settable material to be bonded to a core having a desired configuration at very low pressures to form a trim strip.

3 Claims, 3 Drawing Sheets

TRIM STRIP WITH ONE-PIECE HEAT SET PLASTIC COVER OVER METAL CORE

CROSS-REFERENCE TO RELATED APPLICATION

This is a continuation of U.S. patent application Ser. No. 703,242, filed May 20, 1991, now U.S. Pat. No. 5,277,950, which is a continuation-in-part of U.S. application Ser. No. 619,126, filed Nov. 28, 1990, now U.S. Pat. No. 5,328,731.

BACKGROUND OF THE INVENTION

The present invention relates to trim strips or molding and, more particularly, to a trim strip or molding manufactured from a combination of injection molding and extruding processes.

In commonly known injection molding operations, generally the molds utilized in the operation are very heavy, sturdy and durable. This is due to the fact that the material injected into the molds is at elevated temperature and pressure. Thus, the molds must be very strong and durable to endure the increased temperature and pressure which also explains their high cost.

During the manufacturing of trim strips with metal cores, which are formed from a metal forming process, the passed strips may include what is known in the field as "surface chatter". Surface chatter is the irregular appearance of the outer plastic layer caused by vibration of the metallic core as it passes through the metallic extruding dies. Surface chatter detracts from the appearance and may render the trim strips useless causing the trim strips to be scrapped.

Another problem existing in the current injection process is molding an end cap onto the extruded strip. Generally if metallic colors are used in the strip, metallic "flow lines" will appear on the surface of the end caps. These flow lines present an objectionable appearance and sometimes cause the molded assemblies to be re-worked, by re-molding the end cap, or scrapped.

Another problem with the current injection process is that it requires two separate color compounds. One extrusion grade color and one injection molding grade color. Sometimes there are slight color mismatches that occur between these two color compounds. The color mismatch causes the parts to be reworked, by re-molding the end cap, or scrapped if the extrusion color and injection color are off.

Another problem with the current injection process is molding an end cap to a co-extrusion. With an extrusion having a metal core with a shape that is entirely covered or in part covered by extruded material, the problem is that the end cap and the co-extrusion do not strongly bond between one another. If the bond is not of sufficient strength, the end cap will split away from the extrusion causing the part to be re-worked or ultimately scrapped.

Also, during manufacturing of trim strips utilizing an injection molding process for end caps, if there is a slight variation in the extrusion size, flash will appear on the edges of the molded end caps. The flash must be trimmed from the strip which requires additional time and labor to bring the trim strip within desired size and appearance specifications.

Another problem associated with trim strips which have been extruded or injection molded with a metallic color is known as metallic flop. Metallic flop is a phenomena which occurs during the extrusion or injection molding process which provides the trim strip with unidirectional characteristics. That is, the trim strip may only be positioned onto a surface in one direction to provide desired color characteristics. If the trim strip is applied to the vehicle in a reverse direction, the color characteristics of the material are different, e.g., the color of the strip does not match the color of the surface, indicating that the material has been flopped. Particularly, if two parts are laid side by side in the same orientation which they came out of a mold or extruder, that is their forward ends are positioned side by side and their rearward ends are positioned side by side, there would be no apparent difference in color between the two. However, if one of the strips were to be flipped such that the rearward end of one strip was positioned side by side the forward end of the other strip there would be a noticeable difference in color between the two parts. This is known as metallic flop. To alleviate the metallic flop problem, the trim strips are marked as they leave the factory to indicate which direction they should be applied onto the surface.

Another problem existing in current trim strip manufacturing is that with respect to coloring the trim strip. Since the color formulation of the plastic to manufacture the trim strip is ordinarily color checked in small quantities in a research laboratory by a researcher utilizing different apparatus than is utilized in the production of the trim strips, there sometimes is a difference in color. This coloring difference is generally due to the fact that the apparatus or machinery used to produce the color of the plastic of the trim strip in the laboratory is different than the machinery utilized for mass production of trim strips. Thus, once production trim strips are manufactured, if the color does not match the vehicle color, the color formulation of the trim strip must be modified so that the production machinery will produce the desired color appearance.

Trim strips made with current injection molding processes, with hollowed out portions on the underside that are irregular in position, are difficult to make. "Sinks" appear on the top finished surface in the areas where the cross section thickness undergoes a considerable change. These "sinks" degrade the appearance of the finished part surface.

Thus, it is desirous to have trim strips and a method of manufacturing trim strips which overcome the above disadvantages. Accordingly, the present invention provides the art with a trim strip which overcomes the above disadvantages.

The present invention provides the art with a trim strip which is manufactured by a molding process. The molding occurs at very low pressure, if any, to enable utilization of low cost lightweight molds. The trim strip or molding is formed by dispensing liquid plastic into a mold and applying heat to solidify the plastic. Also, a corer preferably an elongated metallic member, is added to the mold prior to the heating cycle. The core, which may have end stops, is adhered to the plastic material to form a one piece trim strip. Plastics that can be used in this invention may be liquid vinyls such as plastisols. The present invention, which is molded at very low pressure, produces trim strips which are substantially color non-directional and substantially eliminate metallic flop.

Since the metal core of the present invention is not passed through extruding dies, the vibration is eliminated and surface chatter is likewise eliminated. Also, due to the flow and molding characteristics of the liquid plastic, the chance of metallic flow lines is substantially eliminated. Further, flash trimming is eliminated because the plastic surface is a "one-piece" construction without joint lines from the end caps.

Also, on account of the low pressure, trim strips with large abrupt changes in thickness may be manufactured without "sinks" on the finished surface. This characteristic is becoming more important due to the trend of new designs requiring high gloss smooth surfaces on new automotive applications where sinks are more noticeable.

From the subsequent detailed description taken in conjunction with the accompanying claims and subjoined drawings, other objects and advantages of the present invention will become apparent to those skilled in the art.

DETAILED DESCRIPTION OF THE PREFERRED EMBODIMENT

Turning to the figures, particularly FIGS. 1–4A, a trim strip is illustrated in accordance with the present invention. The trim strip 10 is an elongated member including a core 12 and outer molding 14.

Figure 1:
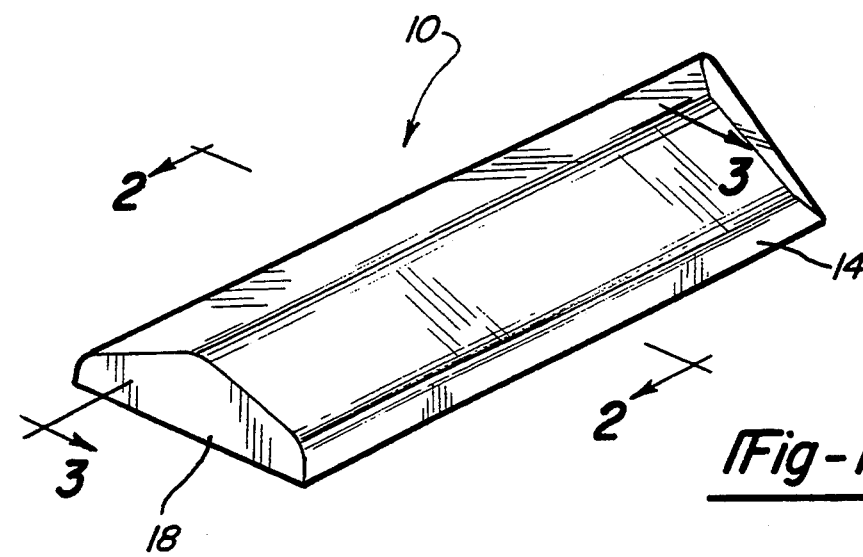
FIG. 1 is a perspective view of a trim strip in accordance with the present invention.
Figures 2, 4A:
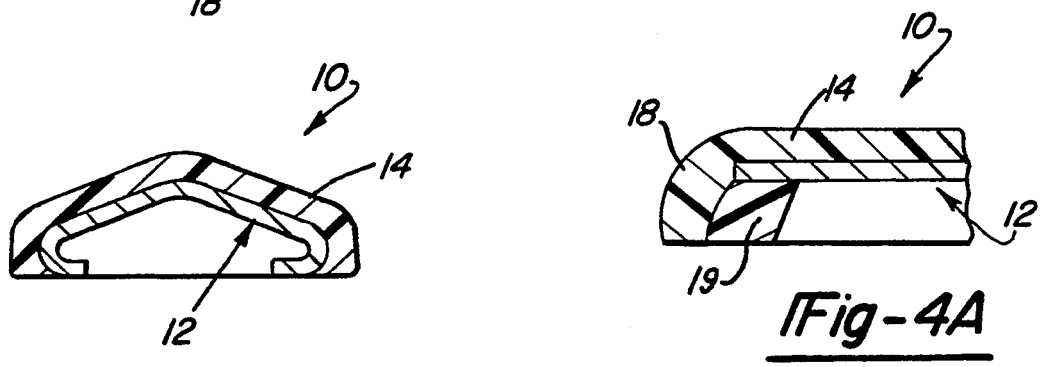
FIG. 2 is a sectional view of FIG. 1 through line 2—2 thereof.
FIG. 4A is a partial sectional view like FIG. 3 of another alternative embodiment of the present invention.
Figure 3:
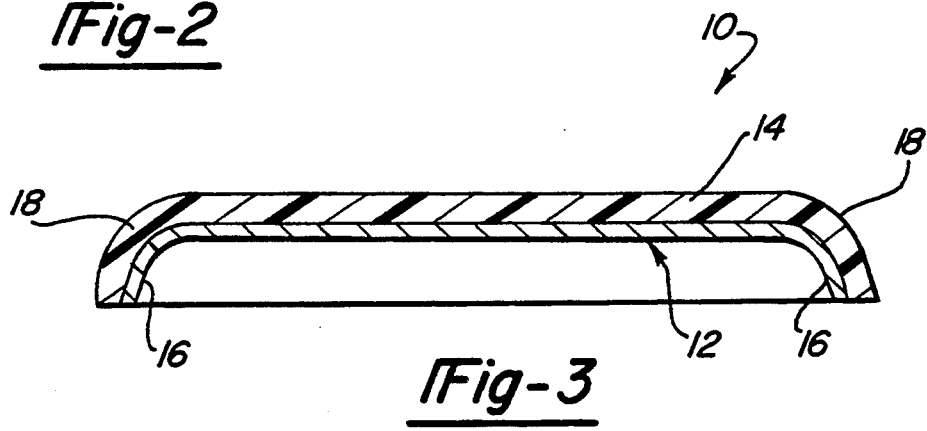
FIG. 3 is a sectional view of FIG. 1 through line 3—3 thereof.
Figure 4:
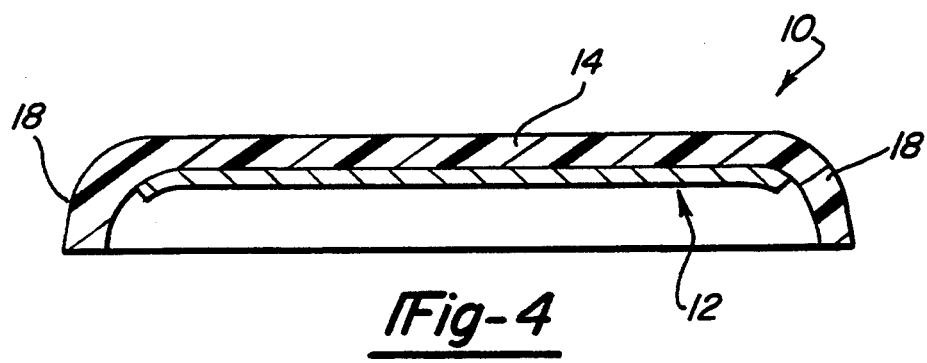
FIG. 4 is a sectional view like FIG. 3 of another alternate embodiment of the present invention.

The core 12 is generally an elongated metallic strip having a desired configuration. The strip is generally roll formed and cut to length. Also, the core 12 may include special angles which are cut as required. As seen in FIG. 2, the core 12 has an overall C shape in transverse cross-section. Also, the core 12 may include unitary stop members 16. Also, the core 12 may have a slight end form to provide a continuous color surface as seen in FIG. 4. The stops 16 provide a means to enable the outer molding 14 to form continuous end caps 18 on the trim strip 10. Also, a removable insert may be inserted during the molding process, FIG. 4, or a permanent insert 19 may be inserted during molding to form end caps on the trim strip, the results are illustrated in FIGS. 4 and 4A.

The outer molding 14 is made from a liquid vinyl chloride resin elastomer material which is generally known as plastisol. Plastisol is available in a number of colors to enable the trim strip to be colored to a manufacturer's specifications. The outer molding may be directly bonded to the base 12 as shown in FIG. 2.

Turning to FIGS. 5–10, a better understanding of the method of manufacturing the trim strip in accordance with the present invention will be understood.

The core 12 is formed or cut to a desired configuration and length. The core 12 may be coated with a liquid chemical primer to enhance the bond strength to the molding 14. The cores 12 are then present to be utilized in the process.

Figure 5:
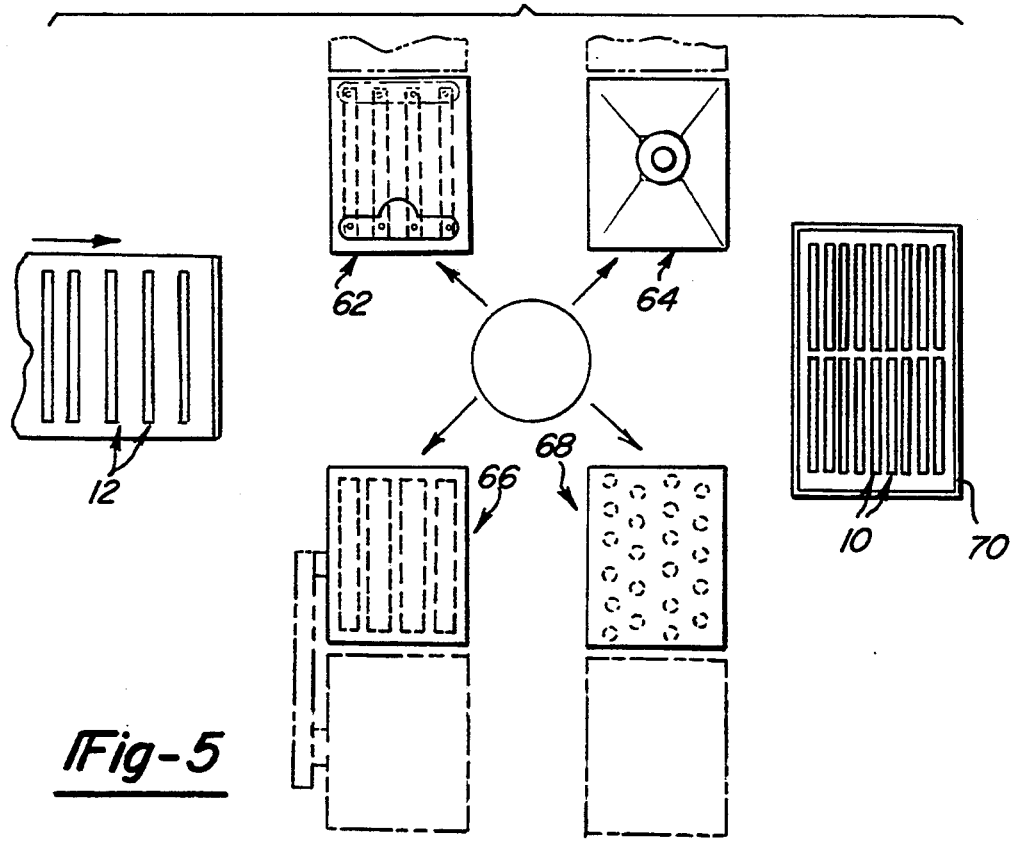
FIG. 5 is a schematic view of a station layout for manufacturing trim strips of the present invention.
Figure 6:
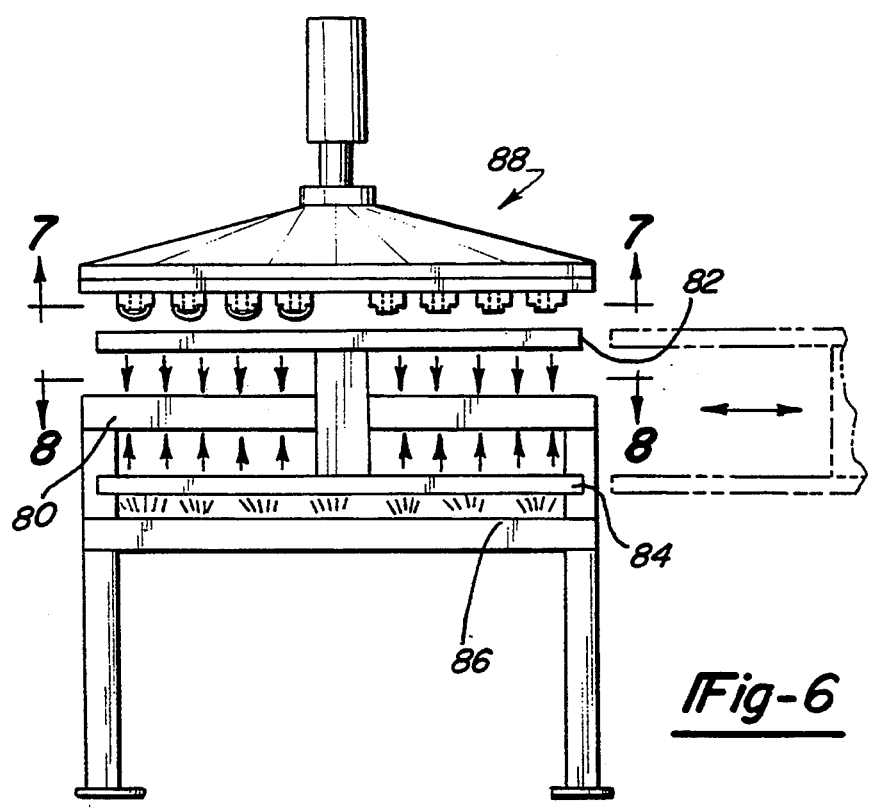
FIG. 6 is a schematic view of a molding apparatus for manufacturing trim strips in accordance with the present invention.
Figure 7:
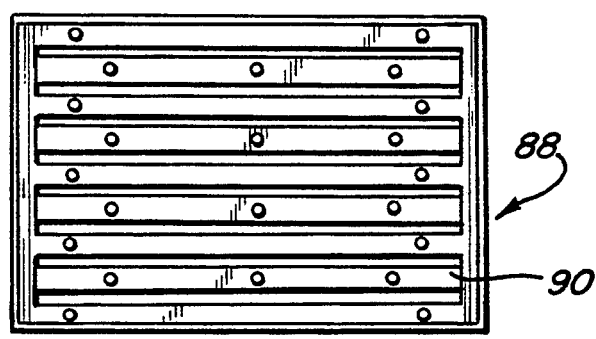
FIG. 7 is a plan view of FIG. 6 of the upper plate along line 7—7 thereof.

FIGS. 5 and 6 illustrate molding apparatus for manufacturing the trim strip 10. FIG. 5 shows a layout for mold stations 62, 64, 66, and 68 where an operator would receive a supply of core members 12 to position into the molds as will be explained with respect to FIG. 6. In FIG. 5, the mold station 62 is shown with a pouring apparatus, mold station 64 is shown adding the core members 12, mold station 66 is shown in the heating mode, and mold station 68 is shown in the cooling mode. Once the trim strips 10 are formed, the operator would place the finished trim strips into a receiving container 70.

Figure 8:
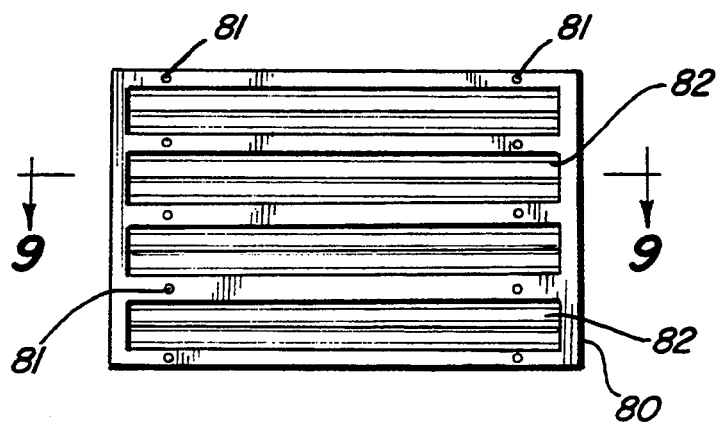
FIG. 8 is a plan view of a mold in accordance with the present invention taken along line 8—8 thereof.
Figure 9:
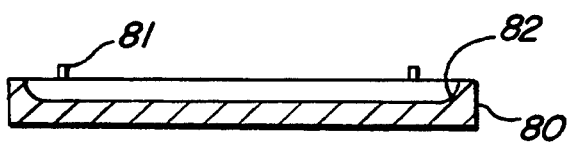
FIG. 9 is a sectional view of the mold of FIG. 8 taken along line 9—9 thereof.

The mold stations 62, 64, 66 and 68 which are substantially identical are best illustrated in FIG. 6. Each mold station includes a lightweight mold 80, movable heaters 82 and 84, cooling spray nozzle 86 and cover assembly 88. The mold 80 as best seen in FIGS. 8 and 9 is stationarily positioned on the apparatus so that the mold 80 is substantially level with respect to horizontal. This enables the liquid plastisol to be poured into the mold 80 and seek its own level to be substantially level in the mold cavities 80. The mold 80 generally has four cavities, however, a number of different cavities could be provided. Also, the mold 80 includes alignment pegs 81 for aligning the vacuum block fixture 90, as will be explained herein.

Figure 10:
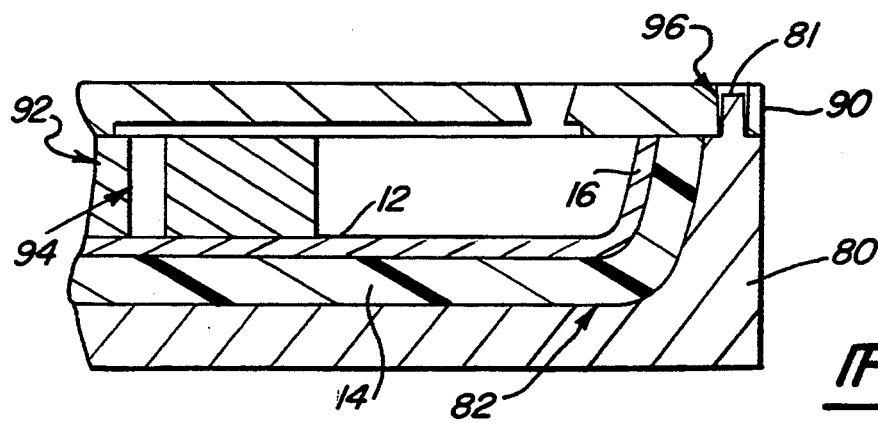
FIG. 10 is an enlarged partial sectional view taken when the cover plate is covering the mold.

Liquid plastisol is poured into the mold cavities in a thick continuous stream. The core 12 is cut to the required length and shape with end inserts if used, secured and held onto vacuum block plate positioning fixture 90, as seen in FIG. 6, and placed into the open mold after the required amount of plastisol has been poured into the mold. The vacuum block plate positioning fixture 90 is removable from the cover assembly 88. This sequence allows the plastisol to form around the core prior to the heating cycle. The mold is then heated with the fixture 90 removed from the cover assembly 88 as seen in FIG. 10 to initiate solidification of the plastisol into an elastomeric mass while the mold is open or uncovered. Generally, a temperature of approximately 170° Celsius will initiate the process. The heating process generally takes up to 4 minutes depending on molding size. As the heating occurs, the plastisol begins to solidify.

The vacuum plate fixture 90 includes several block members 92 extending therefrom. Each block 92 has a vacuum port 94 extending through the block 92 to enable the vacuum to hold the cores 12 onto the fixture 90 as seen in FIG. 6. Also, the fixture 90 includes holes 96 to receive pegs 81 to align the blocks with the cavities 82.

Prior to the heating cycle, the vacuum plate fixture 90 with the core attached is lowered onto the mold 80 as illustrated in FIG. 10. This contacting enables the cores 12 to be submerged into the liquid plastisol. The cores 12 are buoyant in the liquid plastisol and thus the fixture 90 positions the cores at a desired depth in the plastisol.

After the cores 12 have been submerged with the fixture 90 removed from the cover assembly 88 and the vacuum terminated, the mold is heated for a desired period of time. The, cores 12 are held down by the weight of the block members 92 which in turn rest against external vertical stops. After heating, the water spray nozzles 86 are activated to cool the mold 80. Upon cooling, the trim strips 10 are formed and removed from the mold 80. Likewise, the fixture 90 is also removed and attached with the cover assembly 88 awaiting another sequence. Since the heating and cooling steps take place at substantially zero pressure, the trim strips do not encounter the sink problem. Also, with the metal core 12 being placed in contact with the liquid plastic, there is no vibration (as with the surface chatter present extruding operation) and consequently chatter is eliminated.

Likewise, the molds and fixtures may be movable with the water spray nozzles and the heaters stationary. Thus, depending upon the design of the apparatus, a majority of the components may be movable to accomplish the manufacturing of the trim strip. Also, to form continuous end caps on the trim strip, removable or non-removable inserts may be inserted into the ends of the cores prior to positioning onto the fixture block 92. This would be accomplished to allow the heat settable material to form about the insert at the ends of the strip during the heating step. The insert would form end caps on the trim strip to provide a continuous trim strip like that of FIG. 4.

The heat settable outer shell may be manufactured in a plurality of different colors. Generally a color concentrate is added to the heat settable material providing the desired color of the trim strip. The liquid plastic with the color added to it is converted to a finished molding color on the production floor simply by adding heat. This is the same thing that is done in the laboratory for checking the color match. Because of this simple process of adding heat, the subject invention has two color advantages over current production extruding and injection molding processes. First, initial color formulation to a color master is done much faster because only one simple step is needed, the addition of heat, to convert a color blended material to a final processed state. Color formulation in present extruding and injection molding processes requires more complex equipment in the laboratory and the production floor such as heated roll mills, blenders, extruders and injection molding machines (with their own variables—screw designs, speeds, outputs, etc.). All of these items also involve the human element which, in turn, tends to vary the color. Second, day-to-day consistency of color match from laboratory and color blending to the production floor is better than current processes due to the simple process of adding heat to the color-blended liquid plastic.

Since little or substantially no pressure is utilized during the molding operation, the tooling cost of the mold is substantially reduced. Also, the molding process inherently forms trim strips which are substantially color multi-directional. Thus, the trim strip may be manufactured from a molding operation without utilizing high pressures commonly encountered during conventional injection molding.

While the above detailed description describes the preferred embodiment of the present invention, it will be understood that the present invention is susceptible to modifications, variations, and alterations without deviating from the scope and spirit of the subjoined claims.

What is claimed is:

1. A trim strip comprising:
    an elongated core having a desired configuration;
    an outer layer bonded to said core for providing an aesthetic appearance, said outer layer being a vinyl chloride resin elastomer bonded to said core during a low pressure molding process.

2. The trim strip according to claim 1 wherein said trim strip includes a metallic core.

3. The trim strip according to claim 1 wherein said trim strip is colored.

* * * * *